(12) United States Patent
Zhang

(10) Patent No.: US 12,388,281 B2
(45) Date of Patent: Aug. 12, 2025

(54) CHARGING BASE AND CHARGING SYSTEM

(71) Applicant: SHARKGULF TECHNOLOGY (SHANGHAI) CO., LTD., Shanghai (CN)

(72) Inventor: Jun Zhang, Shanghai (CN)

(73) Assignee: SHARKGULF TECHNOLOGY (SHANGHAI) CO., LTD., Shanghai (CN)

( * ) Notice: Subject to any disclaimer, the term of this patent is extended or adjusted under 35 U.S.C. 154(b) by 622 days.

(21) Appl. No.: 17/777,393

(22) PCT Filed: Oct. 19, 2020

(86) PCT No.: PCT/CN2020/121769
§ 371 (c)(1),
(2) Date: May 17, 2022

(87) PCT Pub. No.: WO2021/093518
PCT Pub. Date: May 20, 2021

(65) Prior Publication Data
US 2022/0407335 A1    Dec. 22, 2022

(30) Foreign Application Priority Data
Nov. 17, 2019    (CN) .......................... 201911123864.1

(51) Int. Cl.
*H02J 7/00*    (2006.01)
*G08B 17/10*    (2006.01)
(Continued)

(52) U.S. Cl.
CPC .......... *H02J 7/00712* (2020.01); *G08B 17/10* (2013.01); *H02J 7/00032* (2020.01);
(Continued)

(58) Field of Classification Search
CPC .............. H02J 7/00712; H02J 7/00032; H02J 7/00304; H02J 7/00308; H02J 7/0031;
(Continued)

(56) References Cited

U.S. PATENT DOCUMENTS

2007/0247134 A1* 10/2007 Ryan ................... H04L 12/2803
                                                              323/318
2016/0344227 A1* 11/2016 Zhang ................. H02J 7/00308

FOREIGN PATENT DOCUMENTS

| CN | 105119336 A | 12/2015 |
|---|---|---|
| CN | 107154774 A | 9/2017 |

(Continued)

OTHER PUBLICATIONS

International Search Report (with English Translation) and Written Opinion (with Machine Translation) issued on Dec. 17, 2020 in corresponding International Patent Application No. PCT/CN2020/121769; 16 pages.

*Primary Examiner* — Zixuan Zhou

(57) ABSTRACT

A charging base, including a charging circuit, a power supply circuit and a control unit; where the control unit is electrically connected to the charging circuit and the power supply circuit; when a charging voltage or a charging current of the charging circuit exceeds a preset threshold, the control unit controls a connecting line on the charging base to connect to a ground to form a short circuit and be disconnected from an external charging power supply, and controls a charging mode of the charging circuit to switch to a power supply mode of the power supply circuit for supplying power to a safety reminder unit provided on the charging base. The solution in the embodiments can turn off the power output in time and provide a safety alarm when the hardware circuit of the charger fails.

5 Claims, 1 Drawing Sheet

(51) Int. Cl.
    *B60L 3/00*           (2019.01)
    *B60L 3/04*           (2006.01)
    *G06Q 50/40*         (2024.01)
    *G08B 21/18*         (2006.01)

(52) U.S. Cl.
    CPC ...... *H02J 7/00304* (2020.01); *H02J 7/00308* (2020.01); *H02J 7/0031* (2013.01); *B60L 3/0046* (2013.01); *B60L 3/04* (2013.01); *B60L 2200/12* (2013.01); *G06Q 50/40* (2024.01); *G08B 21/182* (2013.01); *G08B 21/185* (2013.01)

(58) Field of Classification Search
    CPC .... G08B 17/10; G08B 21/182; G08B 21/185; B60L 3/0046; B60L 3/04; B60L 2200/12; G06Q 50/40
    USPC .......................................................... 320/153
    See application file for complete search history.

(56) References Cited

FOREIGN PATENT DOCUMENTS

| | | |
|---|---|---|
| CN | 109120030 A | 1/2019 |
| CN | 209497293 U | 10/2019 |
| CN | 110690751 A | 1/2020 |
| JP | 201115581 A | 1/2011 |

\* cited by examiner

CHARGING BASE AND CHARGING SYSTEM

The present application claims the priority to Chinese patent application No. 201911123864.1, titled "Charging base and Charging system" and filed on Nov. 17, 2019, which is hereby incorporated for reference in its entirety for all purposes.

TECHNICAL FIELD

The present application belongs to a technical field of charging, in particular to a charging base and a charging system.

BACKGROUND

The existing charger on the electric vehicle of two wheels only is provided with a voltage-current detection circuit and a control circuit. The battery is easy to be overcharged when the charger fails, resulting in safety accidents such as fire burning.

SUMMARY

The purpose of the embodiment of the present application is to overcome the above problems or at least partially solve or reduce the above problems. The purpose of the present application aims to turn off the power output in time and provide a safety alarm through a solution that the charging base is externally connected to the charger when the hardware circuit of the charger fails.

The present application provides a charging base, including a charging circuit, a power supply circuit and a control unit; wherein the control unit is electrically connected to the charging circuit and the power supply circuit; when a charging voltage or a charging current of the charging circuit exceeds a preset threshold, the control unit controls a connecting line on the charging base to connect to a ground to form a short circuit and be disconnected from an external charging power supply, and controls a charging mode of the charging circuit to switch to a power supply mode of the power supply circuit for supplying power to a safety reminder unit built in the charging base.

In one embodiment, the safety reminder unit comprises a communication unit and a sensor unit both connected to one end of the control unit, and another end of the control unit is connected to the charging circuit.

In one embodiment, the communication unit is connected to a remote server or a mobile terminal; when the charging voltage or the charging current of the charging circuit exceeds the preset threshold, the charging base gives an alarm through a remote server connected to the communication unit and a mobile terminal according to a preset alarm mode.

In one embodiment, the sensor unit comprises a temperature sensor, an infrared sensor and a smoke sensor; when a failure of the charging circuit and a battery is detected by the temperature sensor, the infrared sensor and the smoke sensor, a buzzer gives an alarm.

In one embodiment, the charging circuit is provided with a detection unit, a switch control unit and a charging connection unit; an input end of the switch control unit is connected to an output end of the detection unit, and an output end of the switch control unit is connected to the charging connection unit.

In one embodiment, the charging circuit is further provided with a power supply unit for supplying power to the safety reminder unit; when the charging voltage or the charging current of the charging circuit does not exceed the preset threshold, the charging circuit supplies power to the power supply unit, and when the charging voltage or the charging current of the charging circuit exceeds the preset threshold, the power supply unit supplies power to the safety reminder unit through the power supply circuit and is disconnected from the charging circuit.

Compared with the related art, the present application provides a charging base and a charging system, which can turn off the power output in time and provide a safety alarm when the hardware circuit of the charger fails. A safety reminder unit is integrated on the charger to give an alarm when the battery fails and burns.

On the other hand, the present application provides a charging system, comprising a charger and at least one of the charging bases disclosed above; when a charging voltage or a charging current output by a charger exceeds a preset threshold, the charging base is short circuited when a connecting line on the charging base is connected to a ground and is disconnected from the charger connected to an external charging power supply.

Compared with the related prior art, the beneficial effect of a charging system provided by the present application is the same as that of a charging base disclosed in at least one of technical solutions above, which will not be repeated here.

BRIEF DESCRIPTION OF THE DRAWINGS

In order to more clearly explain the embodiments of the present application or the technical solutions in the related art, the following will briefly introduce the drawings in the embodiments or the description of the related art. It is obvious that the drawings in the following description are some embodiments of the present application. For those skilled in the art, other drawings can be obtained according to these drawings without paying creative labor.

DETAILED DESCRIPTION OF THE EMBODIMENTS

In order to make the purpose, technical solution and advantages of the embodiment of the present application more clear, the technical solution in the embodiment of the present application will be clearly and completely described below in combination with the attached drawings in the embodiment of the present application. Obviously, the described embodiments are part of the embodiments of the present application, not all of the embodiments. Based on the embodiments of the present application, all other embodiments obtained by those skilled in the art without creative work belong to the protection scope of the present application.

It should be noted that the terms "first" and "second" in the description and claims of the present application and the above drawings are used to distinguish similar objects, and need not be used to describe a specific order or sequence. It should be understood that the data so used can be interchanged where appropriate so that the embodiments of the present application described herein can be implemented in an order other than those illustrated or described herein.

After study, the Applicant found that the charger in the related art only is provided with a voltage-current detection circuit and a control circuit. The battery is easy to be overcharged when the charger fails, resulting in safety accidents such as fire burning.

In order to solve the above problems, the embodiment of the present application provides a charging base, including a charging circuit, a power supply circuit and a control unit. The control unit is electrically connected to the charging circuit and the power supply circuit. When a charging voltage or a charging current of the charging circuit exceeds a preset threshold, the control unit controls a connecting line on the charging base to connect to a ground to form a short circuit and be disconnected from an external charging power supply, and controls a charging mode of the charging circuit to switch to a power supply mode of the power supply circuit for supplying power to a safety reminder unit built in the charging base, so that the power output can be turned off in time and the safety alarm can be provided when the hardware circuit of the charger fails. A safety reminder unit is integrated on the charger to give an alarm when the battery fails and burns.

Figure 1:
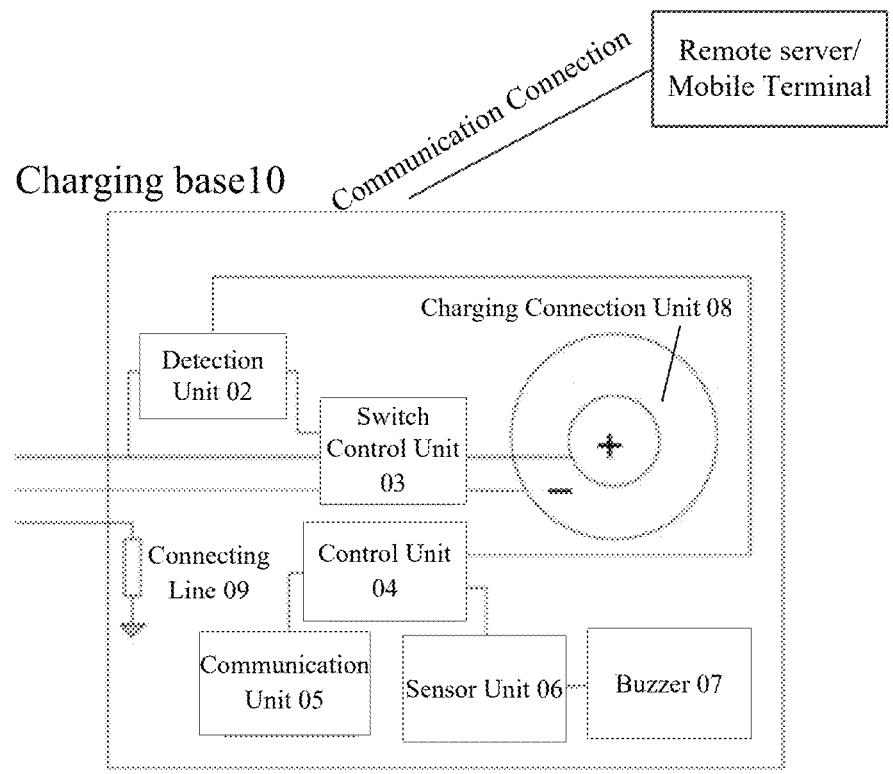
FIG. 1 is a structural layout of a charging base disclosed by the present application.
Figure 2:
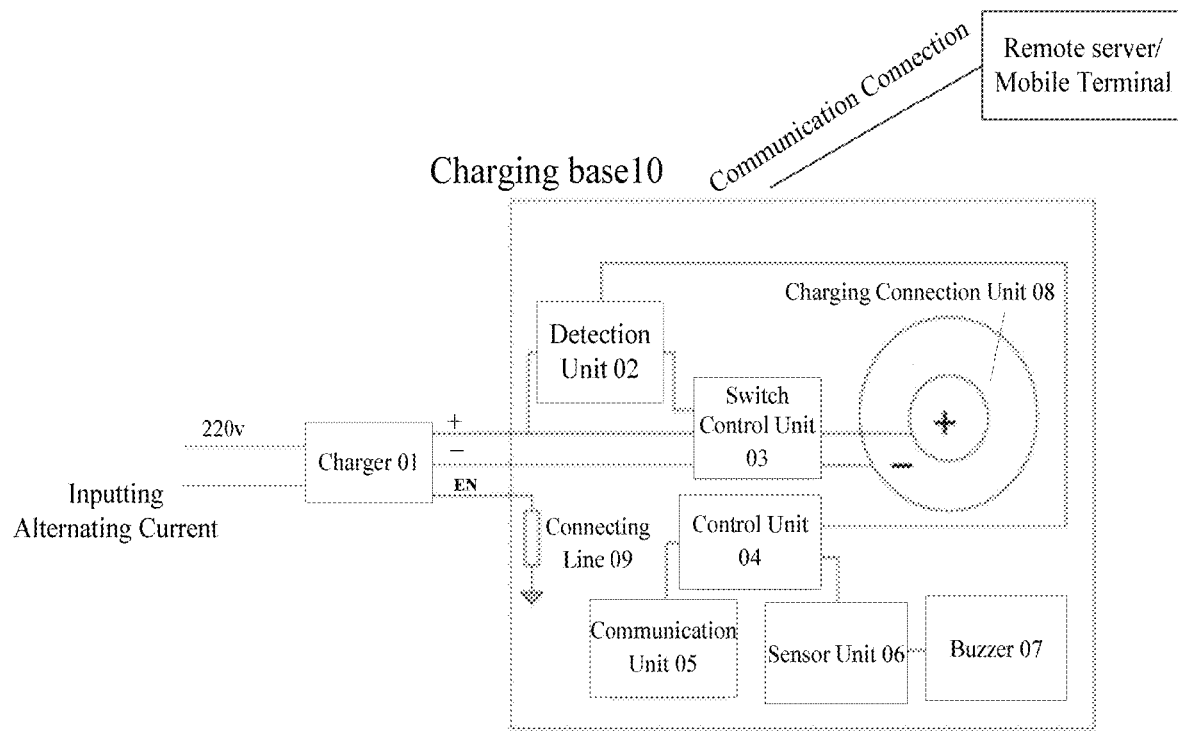
FIG. 2 is a structural layout of a charging system disclosed by the present application.

Referring to FIG. 1, FIG. 1 is a structural layout of a charging base disclosed by the present application.

The present application discloses a charging base, which comprises a charging circuit, a power supply circuit and a control unit 04. The charging circuit and the power supply circuit are electrically connected to the control unit 04. When a charging voltage or a charging current of the charging circuit to a charging power supply exceeds a preset threshold, the control unit 04 controls a connecting line 09 on the charging base to connect to a ground to form a short circuit and be disconnected from an external charging power supply, and controls a charging mode of the charging circuit to switch to a power supply mode of the power supply circuit for supplying power to a safety reminder unit built in the charging base.

Specifically, the charging circuit is provided with a detection unit 02, a switch control unit 03 and a charging connection unit 08, an input end of the switch control unit 03 is connected to an output end of the detection unit 02, an output end of the switch control unit 03 is electrically connected to the charging connection unit 08, and the charging connection unit 08 is connected to the charging power supply.

It should be noted that the detection unit 02 on the charging circuit detects a value of the voltage or the current input by the external power supply in real time. If the value of the voltage or the current exceeds the preset threshold, the detection unit 02 sends an abnormal condition that the value of the voltage or the current of the charging circuit exceeds the preset threshold to the control unit 04, the control unit 04 controls a control switch unit 02 to turn off to stop charging the charging power supply connected to the charging connection unit 08.

Since the external power supply is only used to charge the charging power supply, when the external power supply is abnormal, the external power supply is not available. Therefore, in the embodiment of the present application, the charging circuit on the charging base is also provided with a power supply unit (not shown) for supplying power to the safety reminder unit. When the charging voltage or the charging current of the charging circuit does not exceed the preset threshold, the charging circuit supplies power to the power supply unit, and when the charging voltage or the charging current of the charging circuit exceeds a preset threshold, the power supply unit supplies power to the safety reminder unit through the power supply circuit and is disconnected from the charging circuit.

The charging circuit is connected to the charger for connecting the external power supply, the power supply circuit is used for supplying power to the safety reminder unit, the power supply circuit is connected to the power supply unit provided on the charging base. When the external power supply doesn't supply power, the power supply unit is connected to the charging circuit for charging the power supply unit. The power supply unit is a rechargeable power supply unit, and the power supply unit is used for supplying power to the safety reminder unit in case of emergency. When there is no abnormality, the power supply unit is charged to be in the charging state through the charging circuit. After the power supply unit is charged fully, the charging is stopped. The control unit on the charging base will monitor the power of the power supply unit in real time. If the power of the power supply unit is insufficient, it will connect the charging circuit in time to charge the power supply unit.

Since the charging base is provided with the detection line 09 connected to the charger, when the voltage or the current input by the external power supply is abnormal, such as exceeding the preset threshold, the control unit 04 controls the connecting line 09 on the charging base to connect to the ground to form a short circuit and be disconnected from the external charging power supply, and controls the charging mode of the charging circuit to switch to the power supply mode of the power supply circuit for supplying power to the safety reminder unit built in the charging base, so that when the charging voltage or charging current is abnormal, a connection with the external power supply can be cut off in time to protect the components of the base.

Further, the safety reminder unit comprises a communication unit 05 and a sensor unit 06 both connected to one end of the control unit 04, another end of the control unit 04 is connected to the charging circuit, and the communication unit 05 is connected to a remote server or a mobile terminal. When the charging voltage or the charging current of the charging circuit exceeds the preset threshold, the charging base gives an alarm through the remote server connected to the communication unit 04 and the mobile terminal according to the preset alarm mode.

It should be noted that when the charging voltage or the charging current of the external power supply is abnormal, the control unit will cut off the charging of the charging circuit to the power supply to be charged, thereby avoiding short circuit or electric shock, and then the safety reminder unit is charged through the power unit on the charging base. The safety reminder unit starts to work, and the control unit controls the safety reminder unit to work. The communication unit in the safety reminder unit is mainly used to transmit the signal to the remote server and the mobile terminal for alarm when the abnormal conditions happen in the charging base. For example, when the charging voltage or the charging current exceeds the preset threshold, the communication unit transmits the signal to the remote server and the mobile terminal for alarm.

The sensor unit 06 comprises a temperature sensor, an infrared sensor and a smoke sensor. When the failure of the charging circuit and battery is detected by the temperature sensor, the infrared sensor and the smoke sensor, the buzzer will give an alarm. For example, when the high temperature, fire and smoke due to the failure of the power supply to be charged are detected, the buzzer 07 will output a high decibel buzzer for alarm.

On the other hand, the present application also provides a charging system, including a charger 01 and the disclosed charging base 10. When the charging voltage or the charging current output by the charger 01 exceeds a preset threshold, the charging base is short circuited when the connecting line 09 on the charging base is connected to the ground and the charging base is disconnected from the charger 01 connected to the external charging power supply.

The charging system disclosed by the present application can turn off the power output in time and provide a safety alarm when the hardware circuit of the charger fails through the solution that the charger is externally connected to the charging base.

Finally, it should be noted that the above embodiments are only used to illustrate the technical solution of the present application, not to limit the technical solution of the present application. Although the present application is described in detail with reference to the above embodiments, those skilled in the art should understand that it can still modify the technical solution recorded in the above embodiments, or make equivalent replacement for some or all of the technical features. These modifications or replacements do not make the corresponding technical solution to essentially separate from the scope of the technical solution of each embodiment of the present application.

The invention claimed is:

1. A charging base, applied to an electric vehicle of two wheels, comprising: a charging circuit, a power supply circuit and a control unit; wherein the control unit is electrically connected to the charging circuit and the power supply circuit;
   wherein the charging circuit is provided with a detection unit, a switch control unit and a charging connection unit; an input end of the switch control unit is connected to an output end of the detection unit, and an output end of the switch control unit is connected to the charging connection unit;
   when the detection unit detects that a charging voltage or a charging current of the charging circuit input by an external power supply exceeds a preset threshold, the detection unit sends an abnormal condition that the charging voltage or the charging current of the charging circuit exceeds the preset threshold to the control unit, the control unit controls the switch control unit to turn off to stop charging the charging power supply connected to the charging connection unit, controls a connecting line on the charging base to connect to a ground to form the short circuit and be disconnected from the external charging power supply, and controls a charging mode of the charging circuit to switch to a power supply mode of the power supply circuit for supplying power to a safety reminder unit built in the charging base; and
   the charging circuit is further provided with a power supply unit for supplying power to the safety reminder unit; when the charging voltage or the charging current of the charging circuit does not exceed the preset threshold, the charging circuit supplies power to the power supply unit, and when the charging voltage or the charging current of the charging circuit exceeds the preset threshold, the power supply unit supplies power to the safety reminder unit through the power supply circuit and is disconnected from the charging circuit.

2. The charging base according to claim 1, wherein the safety reminder unit comprises a communication unit and a sensor unit, both connected to one end of the control unit, and another end of the control unit is connected to the charging circuit.

3. The charging base according to claim 2, wherein the communication unit is connected to a remote server or a mobile terminal; when the charging voltage or the charging current of the charging circuit exceeds the preset threshold, the charging base gives an alarm through a remote server connected to the communication unit and a mobile terminal according to a preset alarm mode.

4. The charging base according to claim 2, wherein the sensor unit comprises a temperature sensor, an infrared sensor, and a smoke sensor; when a failure of the charging circuit and the battery is detected by the temperature sensor, the infrared sensor and the smoke sensor, a buzzer gives an alarm.

5. A charging system, comprising a charger and a charging base according to claim 1, wherein when a charging voltage or a charging current output of the charger exceeds a preset threshold, the charging base is short circuited by a connecting line of the charging base is connected to a ground and is disconnected from the external charging power supply.

* * * * *